(12) United States Patent
Topiwala et al.

(10) Patent No.: US 9,886,366 B2
(45) Date of Patent: Feb. 6, 2018

(54) REPLAY-SUITABLE TRACE RECORDING BY SERVICE CONTAINER

(71) Applicant: Microsoft Technology Licensing, LLC, Redmond, WA (US)

(72) Inventors: Sajid Topiwala, San Jose, CA (US); Anant Rao, Fremont, CA (US); Pritesh Shah, Sunnyvale, CA (US); Walter Scott Johnson, San Franciso, CA (US); Arunprasad Venkatraman, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/080,989

(22) Filed: Mar. 25, 2016

(65) Prior Publication Data

US 2017/0277616 A1 Sep. 28, 2017

(51) Int. Cl.
*G06F 9/44* (2006.01)
*G06F 11/36* (2006.01)
*H04L 29/08* (2006.01)

(52) U.S. Cl.
CPC ............ *G06F 11/364* (2013.01); *H04L 67/02* (2013.01)

(58) Field of Classification Search
None
See application file for complete search history.

(56) References Cited

U.S. PATENT DOCUMENTS

| 6,070,190 | A | 5/2000 | Reps |
| 6,192,108 | B1 | 2/2001 | Mumford |
| 6,427,000 | B1 | 7/2002 | Mumford |
| 6,546,413 | B1* | 4/2003 | Northrup ................. G06F 9/54 709/200 |
| 9,253,255 | B1* | 2/2016 | Bosch ................. H04L 67/1093 |
| 9,519,920 | B1* | 12/2016 | Chitilian ................. G06F 9/542 |
| 2004/0060057 | A1 | 3/2004 | Hansen |

(Continued)

OTHER PUBLICATIONS

Ribeiro, Camilo, Twitter Diffy, "My First Impressions" Testing Flavors, Testing and Continuous Delivery, http://testingflavors.com/2015/09/19/twitter-diffy-my-first-impressions/, dated Sep. 19, 2015, 9pgs.

(Continued)

*Primary Examiner* — Chameli Das
(74) *Attorney, Agent, or Firm* — Hickman Palermo Becker Bingham LLP

(57) ABSTRACT

Techniques are provided for recording service invocation traffic in a format that is suitable for subsequent replay, perhaps in a different environment. In one technique, a computing device records invocation traffic. The computing device receives a first request that is directed to a first service. In response to receiving the first request, one or more computers store an identifier of the first request into a second request. After storing the identifier into the second request, the computing device causes the second request to be sent to a second service. After causing the second request to be sent to the second service, the computing device receives, from the second service, a response that contains the identifier of the first request. The one or more computers store, in a single record, the first request, the second request, and the response.

19 Claims, 9 Drawing Sheets

(56) References Cited

U.S. PATENT DOCUMENTS

| | | | |
|---|---|---|---|
| 2004/0139152 A1* | 7/2004 | Kaler | H04L 63/0435 709/203 |
| 2005/0120341 A1 | 6/2005 | Blumenthal | |
| 2006/0074807 A1* | 4/2006 | Gauba | G11B 27/105 705/51 |
| 2007/0079382 A1* | 4/2007 | Celikkan | G06F 21/40 726/26 |
| 2007/0129929 A1 | 6/2007 | Nakamura | |
| 2007/0263541 A1 | 11/2007 | Cobb | |
| 2008/0162552 A1 | 7/2008 | Bonev | |
| 2008/0178161 A1* | 7/2008 | Cates | G06F 11/3612 717/133 |
| 2008/0178169 A1 | 7/2008 | Grossner | |
| 2009/0165107 A1* | 6/2009 | Tojo | H04L 63/0815 726/7 |
| 2009/0324214 A1* | 12/2009 | Li | H04B 10/075 398/1 |
| 2011/0231477 A1* | 9/2011 | Safruti | G06F 9/5033 709/203 |
| 2011/0231519 A1* | 9/2011 | Luby | H04N 21/23106 709/219 |
| 2013/0346490 A1* | 12/2013 | Subramanian | G06F 17/30132 709/203 |
| 2014/0250443 A1* | 9/2014 | Greiner | G06F 11/3688 719/328 |
| 2014/0297405 A1 | 10/2014 | Fine | |
| 2014/0344520 A1* | 11/2014 | Jenkins | G06F 12/0815 711/118 |
| 2015/0007176 A1 | 1/2015 | Kotani | |
| 2015/0095694 A1* | 4/2015 | Nishino | G06F 11/2071 714/6.23 |
| 2015/0319794 A1* | 11/2015 | Long | H04W 8/20 370/329 |
| 2016/0019133 A1* | 1/2016 | Forg Cs | G06F 11/3612 717/128 |
| 2016/0170823 A1* | 6/2016 | Miller | G06F 11/0772 714/56 |
| 2017/0220448 A1 | 8/2017 | Topiwala et al. | |

OTHER PUBLICATIONS

Ruth et al., "A Sate Regression Test Selection Technique for Web Services", dated 2007, IEEE, 6 pages.

Khanduri, Puneet, "Diffy: Testing Serices Without Writing Tests", https://blog.twitter.com/2015/diffy-testing-services-without-writing-tests>, dated Sep. 3, 2015, 8 pages.

Topiwala, U.S. Appl. No. 15/012,600, filed Feb. 1, 2016, Office Action, dated May 17, 2017.

Topiwala, U.S. Appl. No. 15/012,600, filed Feb. 1, 2016, Notice of Allowance, dated Sep. 11, 2017.

Topiwala, U.S. Appl. No. 15/012,600, filed Feb. 1, 2016, Interview Summary, dated Aug. 9, 2017.

* cited by examiner

REPLAY-SUITABLE TRACE RECORDING BY SERVICE CONTAINER

CROSS REFERENCE TO RELATED CASES

This application is related to U.S. application Ser. No. 15/012,600, which was filed on Feb. 1, 2016 and is incorporated by reference as if fully described herein.

FIELD OF THE DISCLOSURE

The present disclosure relates to capturing invocation traffic of software services. Techniques for recording production service invocations into a format that is suitable for replay within a laboratory are presented.

BACKGROUND

Discovering some regression bugs that degrade the performance or behavior of software is difficult without a production workload. A production environment may be available when a service progresses through the release cycle all the way to a canary release or until the service is fully deployed in production. A revision of source code that is committed to version control may cause a regression in performance that is only evident under high load or reveal that a latent bug that remained hidden for a long time is now triggered. Generally, these kinds of defects are difficult to isolate. For example, it can take longer to isolate a bug in source code than it takes to fix the bug. When a latent bug later emerges, some context regarding the offending commit may be lost, which can increase the time needed to fix the bug. A performance regression is important to quickly discover and isolate because it can decrease end user satisfaction and increase the consumption of valuable resources, such as time and electricity.

Here are some reasons why finding regressions late in release cycle is problematic:

Isolating offending commit(s) is hard;
  Even after the commit has been identified. The semantics of the code or the logical flow might be forgotten, and it might be difficult to fix the bug without completely understanding the intent of the entire commit;
  The code needs to roll back from Production machines;
  The release cycle is reset and throws off team timelines and deliverable schedules;
  New developers get skittish about making check-ins, perhaps because a release may be difficult to roll back. This can cause stress and impact the job satisfaction of a developer.
  Release cycles are deliberate and long, exacerbating the issues mentioned above.

Another complication is that approximating realistic traffic during a test is difficult. Test scripts tend to use hardcoded stimuli (test inputs) that only exercise a more or less narrow subset of realistic inputs. Identification and exploration of boundary-case inputs may depend upon the imagination and vigilance of a test engineer, which is error prone and seldom exhaustive. A way is needed to handle all of these issues before the service gets released.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for recording service invocation traffic in a format that is suitable for subsequent replay, perhaps in a different environment. In one technique, a computing device records invocation traffic. The computing device receives a first request that is directed to a first service. In response to receiving the first request, one or more computers store an identifier of the first request into a downstream request. After storing the identifier into the downstream request, the computing device causes the downstream request to be sent to a second service. After causing the downstream request to be sent to the second service, the computing device receives, from the second service, a response that contains the identifier of the first request. The one or more computers store, in a single record, the first request, the downstream request, and the response.

In an embodiment, a sampling of production traffic is automatically recorded. Some or all of a call tree of service calls and responses is stored as a unit.

In an embodiment, a software container hosts a software service. The container intercepts, decorates, records, and relays the invocation traffic of the service.

In an embodiment, recording infrastructure uses message headers to propagate context metadata, such as an identifier of a call tree. In an embodiment, a custom HTTP header bears such metadata.

In an embodiment, the recording infrastructure includes a publish-subscribe topic framework to manage the availability of recordings.

Example Computer System

Figure 1:
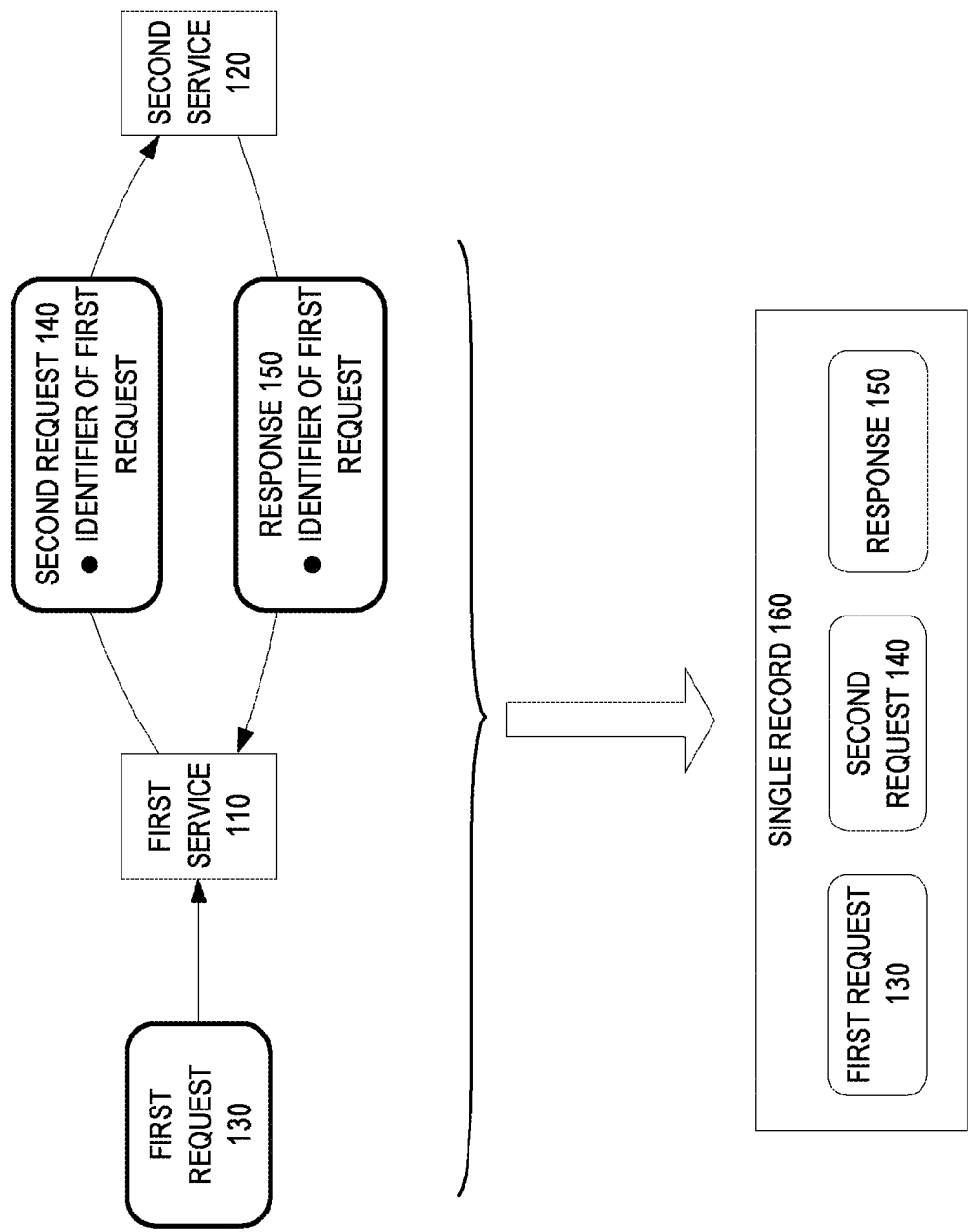
FIG. 1 is a block diagram that depicts an example computer cluster that records service invocation traffic, in an embodiment.

FIG. 1 is a block diagram that depicts example computer cluster 100 that records service invocation traffic, in an embodiment. Computer cluster 100 may make recordings of production service invocations into a format that is suitable for replaying the service invocations within a laboratory.

Computer cluster 100 may be any computer or networked aggregation of computers. A computer of computer cluster 100 may be a personal computer, a rack server such as a blade, a virtual machine, a smartphone, or other general purpose computer. Computer cluster 100 may be a production cluster that hosts released software, such as applications and services, and experiences live traffic.

Computer cluster 100 includes services 110 and 120. Each of these services may be any software component that exposes a service interface and that can be instantiated within a software container.

Services 110 and 120 may each be a bean, a component, a module, a script, or other software unit that can be decoupled from its dependencies such as downstream services that first service 110 may invoke, such as second service 120. Services 110 and 120 may each be a web service that accepts a request and then processes the request to generate a response.

Downstream services may be helper services, central services, and infrastructural services, which may reside upon an enterprise service bus (ESB) or within a point-to-point constellation such as a service oriented architecture (SOA) or other ecosystem of distributed services.

In an embodiment, services 110 and 120 are invoked remotely or from another operating system process. In an embodiment, service 110 invokes downstream services that are remote or within another operating system process.

In an embodiment, services 110 and 120 use a low-level protocol for transport such as hypertext transfer protocol (HTTP) or JAVA™ remote method protocol (JRMP) to transfer a request or a response. JAVA is a registered trademark of Oracle Corporation. In an embodiment, services 110 and 120 use a high-level protocol to coordinate with other programs that are remote or within another operating system process.

In an embodiment, the high-level protocol is synchronous, such as a remote procedure call (RPC) protocol, such as representational state transfer (REST), simple object access protocol (SOAP), or JAVA remote method invocation (RMI). In an embodiment, the high-level protocol is asynchronous, such as protocol buffers or JAVA message service (JMS). In an embodiment, requests and responses bear data that is encoded according to a marshalling format such as extensible markup language (XML), JavaScript object notation (JSON), or JAVA object serialization.

In operation, computer cluster 100 receives or generates requests, such as 130, each of which invokes a software service, such as first service 110. First service 110 processes and fulfills first request 130.

In an embodiment, first request 130 arrives from an external client platform, such as a web browser. In an embodiment, first request 130 arrives from an upstream service within computer cluster 100.

Although not shown, first service 110 may emit a response as an answer to first request 130. For example, first request 130 may request data retrieval, and first service 110 may answer by sending a response that bears the requested data.

In fulfilling first request 130, first service 110 may invoke downstream services, such as second service 120. For example, first service 110 may send second request 140 to second service 120. Second service 120 may answer second request 140 by sending response 150 to first service 110.

Although not shown, second service 120 may itself invoke other downstream services. Such daisy chaining of service invocations may create a call tree of arbitrary depth that is rooted at first request 130.

Although also not shown, first service 110 may directly invoke additional downstream services. This may cause a call tree of arbitrary fan out.

Computer cluster 100 has infrastructure that can selectively or unconditionally record whole or partial call trees or individual requests or responses. In this example, a whole call tree is recorded as one data structure, such as single record 160 that includes requests 130 and 140 and response 150.

If first service 110 also emits a response, then that response may be included in the recorded call tree. In an embodiment, only requests and responses that directly involve first service 110 are recorded. In that case, 140 and 150 are recorded, but calls made by second service 120 are not recorded.

First request 130 may be one of many inbound requests within the traffic of computer cluster 100. First request 130 may be one of many invocations of first service 110. Second service 120 may be invoked by services other than first service 110.

As such, assembly of single record 160 may require that computer cluster 100 use a correlation mechanism to determine which downstream requests occur in satisfaction of first request 130 and to determine which responses, such as 150, answer which downstream requests. To accomplish such correlation, computer cluster 100 may associate first request 130 with a unique identifier.

For example, the identifier may be contained within first request 130 upon delivery to computer cluster 100. Alternatively, computer cluster 100 may generate an identifier for first request 130, perhaps synthesized from details such as an arrival timestamp and/or the identity of the invoked service 110.

To assist with correlation of the requests and responses of a call tree, computer cluster 100 may write the identifier of first request 130 into some or all downstream requests and responses of the call tree for first request 130. For example, before sending second request 140, computer cluster 100 may write the identifier of first request 130 into second request 140.

Likewise, computer cluster 100 may propagate the identifier of first request 130 to other downstream calls that second service 120 may make. Likewise, the identifier of first request 130 may be written into downstream responses, such as 150.

Computer cluster 100 may use various data structures to keep track of downstream requests and responses for multiple outstanding call trees. For example, a hash table may assist with associating a downstream request to an upstream request, associating a downstream response with the downstream request for which it answers, or associating any or all of these requests or responses with a particular call tree, a particular root request such as first request 130, or a particular entry point such as first service 110.

In an embodiment, computer cluster 100 uses single record 160 as a data structure to track a given call tree during its execution. In another embodiment, intermediate data structures are used instead, and single record 160 is not created until the whole call tree is already tracked and correlated.

In an embodiment, the recording infrastructure is instrumented directly within the implementations of services 110 and 120. In an embodiment, the instrumentation is achieved by type attribution, such as JAVA annotations, or by aspect weaving.

In an embodiment, the recording infrastructure is centralized within a software container that hosts services such as 110 or 120. For example, services 110 and 120 may each be a servlet that is hosted by a web server that records call trees in a way that is transparent (non-intrusive, not noticeable) to the service.

For example, services 110 and 120 may be unaware that request 140 and response 150 bear the identifier of first request 130. In an embodiment, services 110 and 120 produce or consume messages 140 and 150 without accessing the identifier.

In an embodiment, the recording infrastructure is centralized within a network proxy. For example, an HTTP proxy may act as a relay that is transparent to the services and that records call trees that pass through it.

Some or all of the services in production may pass their requests and responses through the recording infrastructure. In an embodiment, computer cluster 100 may mark or otherwise indicate particular inbound requests as designated for recording by the recording infrastructure. For example, every hundredth request may be so marked. In an embodiment, each of some or all services may be deployed with a special build or special configuration such as a command line argument or an environmental variable that activates the recording infrastructure for that service.

In an embodiment, two copies of identical or similar versions of the same services are deployed within computer cluster 100. One copy is configured to record. The other copy is not configured to record but is a primary copy to handle most or nearly all of production traffic without the fragile complexity or performance overhead of recording.

In an embodiment, a sampling of live requests for a service may be routed to the recording version. A load balancer or other routing mechanism may direct most inbound requests to the primary version and divert some of the inbound requests, such as first request 130, to a recording version, shown as first service 110.

In an embodiment, the percentage of requests that are recorded is dynamically configurable. For example, computer cluster 100 may be adjusted to record only 0.1% of requests to service 110 for processing.

Example Recording Process

Figure 2:
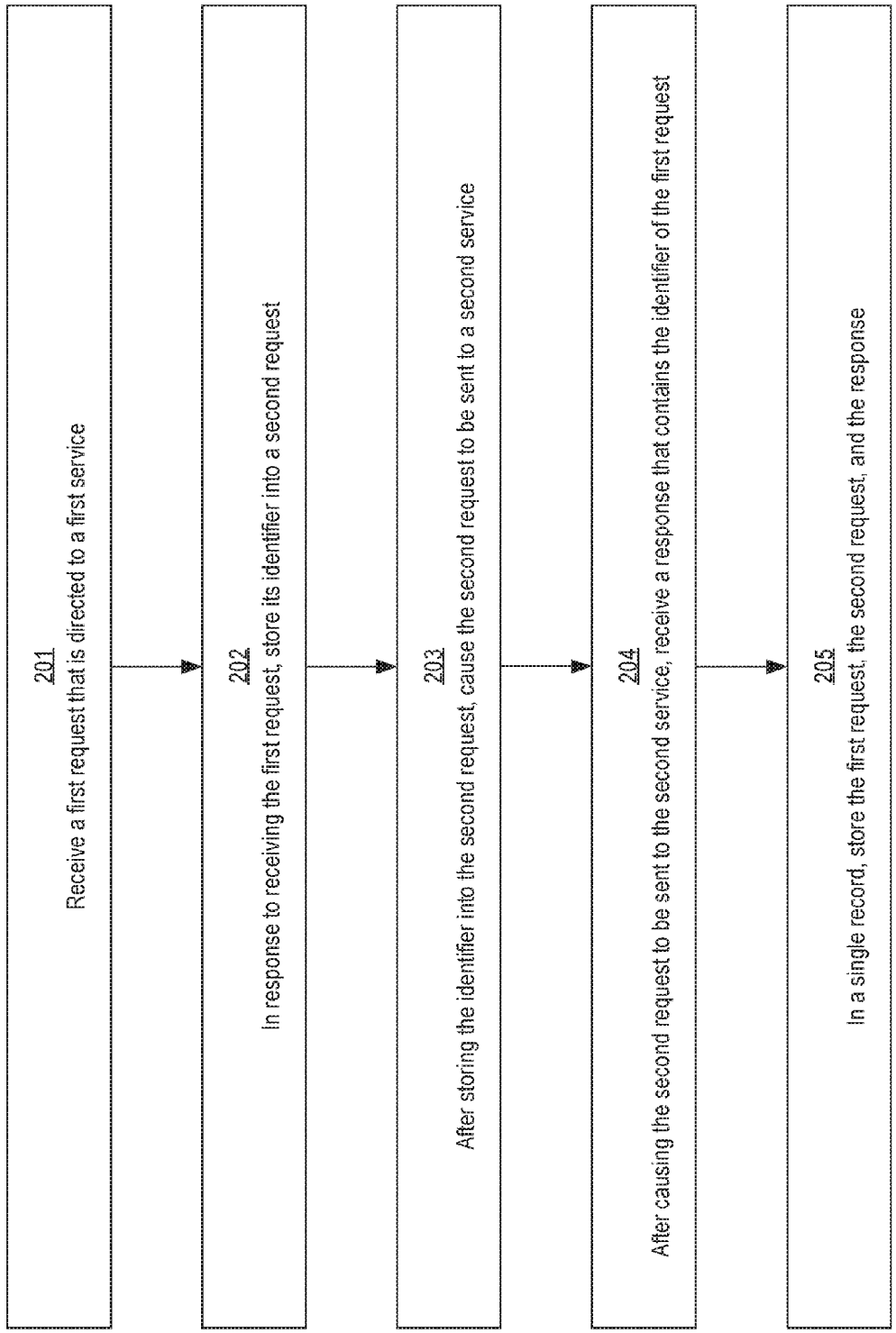
FIG. 2 is a flow diagram that depicts an example process for recording service invocation traffic, in an embodiment.

FIG. 2 is a flowchart that depicts an example process for recording production call trees into a format that is suitable for replaying the call trees within a laboratory. FIG. 2 is discussed with reference to computer cluster 100.

In step 201, a first request is received that is directed to a first service. For example, first service 110 receives first request 130.

In an embodiment, the recording infrastructure of computer cluster 100 has already captured first request 130 within memory before first request 130 arrives at first service 110. In another embodiment, first service 110 provides first request 130 to the recording infrastructure.

Step 202 occurs in response to step 201. In step 202, an identifier of the first request is stored into a second request. For example, first service 110 creates second request 140, and then the recording infrastructure writes the identifier of first request 130 into second request 140.

In an embodiment, the recording infrastructure obtains the identifier by extracting it from first request 130. In another embodiment, the recording infrastructure synthesizes the identifier from scratch and perhaps from contextual details such as a timestamp and/or other identifiers.

In an embodiment, the identifier is added to second request 140 as a message header field, such as a custom HTTP header field. In another embodiment, the identifier is included within a cookie, such as with the HTTP cookie header field.

In another embodiment, the recording infrastructure wraps second request 140 within a new envelope that includes the identifier. In another embodiment, the identifier is written directly into the payload (content body) of second request 140.

Step 203 occurs after step 202. Step 203 causes the second request to be sent downstream to a second service. For example, first service 110 sends second request 140 to second service 120.

Delivery of second request 140 may use a computer network, inter-process communication, or in-process linkage such as with a call stack. Delivery may or may not be synchronous.

Step 204 occurs after step 203. In step 204, a response that contains the identifier of the first request is received.

For example, second service 120 processes second request 140 and answers by sending response 150 to first service 110. Either during creation or transmission of response 150, the recording infrastructure writes the identifier of first request 130 into response 150 before delivering response 150 to first service 110. For example, the recording infrastructure may copy the identifier of first request 130 from second request 140 into response 150.

Finally in step 205, the first request, first response, and second response are stored into a single record. For example, the recording infrastructure uses the identifier of first request 130 to correlate requests 130 and 140 and response 150 with the call tree in which they occur.

In an embodiment, the recording infrastructure uses temporary data structures to cache the ongoing interactions of a call tree until the call tree finishes and then writes the call tree into single record 160. In another embodiment, the recording infrastructure incrementally records the ongoing interaction directly into single record 160 such that when the call tree finishes, single record 160 is fully populated.

After step 205, the recording infrastructure may dispense single record 160 in a variety of ways. For example, single record 160 may be durably stored in a file system or a database. Single record 160 may be placed into a stream or batch for further processing by a downstream consumer, such as a performance profiler or other analytic tool.

Example Network Implementation

Figure 3:
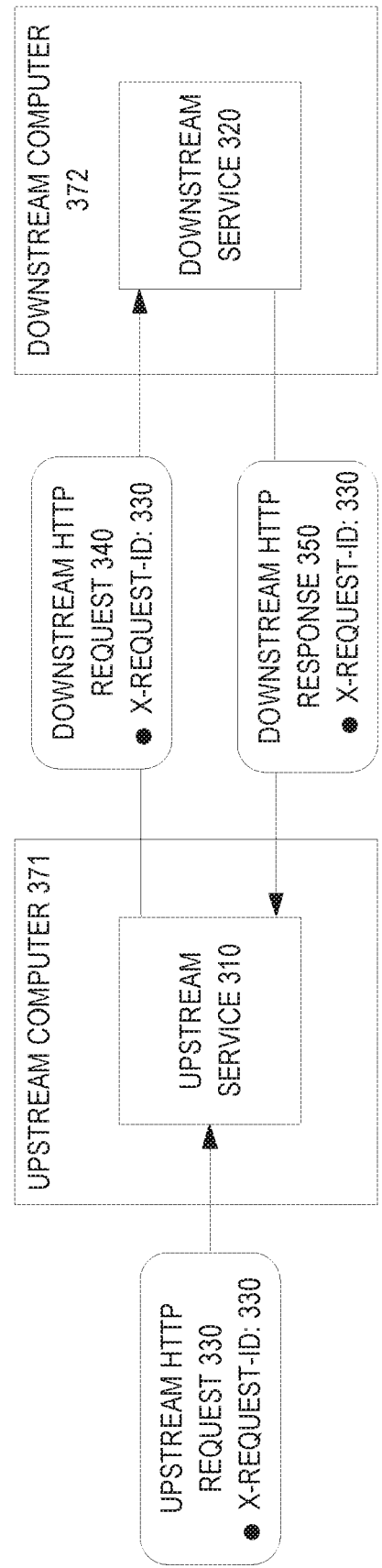
FIG. 3 is a block diagram that depicts an example production cluster that records call trees, in an embodiment.

FIG. 3 is a block diagram that depicts example production cluster 300 that transfers a custom HTTP header between computers, in an embodiment. Production cluster 300 may be an implementation of computer cluster 100 operating as a production environment experiencing live traffic.

Computer cluster 300 includes computers 371-372, which communicate with each other over a computer network or internetwork, although not shown. Computers 371-372 communicate by passing HTTP messages (HTTP requests and responses). For example, these computers may communicate by sending SOAP or REST messages.

Each of computers 371-372 hosts at least one remote service, such as 310 and 320. Although not shown, the techniques of computer cluster 300 are also applicable to services that are locally invoked within the same call tree as services 310 and 320. For example, a service that resides on a computer may use HTTP to invoke another service on the same computer without using a computer network and with or without crossing an operating system process boundary.

Computer cluster 300 may use a custom HTTP message header to propagate a root request identifier throughout the requests and responses of a call tree.

A call tree may have bidirectional interactions, such as a response that answers a request. For bi-directionality, the root request identifier may be sent within a custom HTTP request header field or within a custom HTTP response header field.

In this example, upstream HTTP request 330 is the root request. For this example only, the root request identifier is 330.

In this example, X-Request-Id is the custom HTTP header that bears the root request identifier. For example, an HTTP request or response may bear a header that is literally encoded as "X-Request-Id: 330".

The recording infrastructure of computer cluster 300 may use the custom header to propagate the root request identifier of a call tree. Computer cluster 300 may use the root request identifier to associate requests and responses for storage within a record of the call tree.

In an embodiment not shown, the recording infrastructure is divided into two software layers. A front layer is hosted on computers 371-372. On each computer, that layer records all of the interactions of a call tree that involve that computer.

For example, the front layer could construct records of local activity that involved the host computer. Each record may contain a whole or partial call tree, an interaction pair that has only one request and its response, or an individual message (either a request or a response).

The front layer may transmit these records to a back layer that is centrally hosted on one computer. Although not shown, the back layer may reside on a computer that does not host the front layer because it does not host invocable services.

The back layer may receive records with call tree fragments from which it may then reconstruct a whole call tree. The back layer may use the correlation techniques elsewhere herein to detect how fragments of a call tree should interlock to form a whole tree.

In an embodiment that maximizes record throughput, the front layer transmits records to the back layer using a packet protocol that is connectionless or otherwise unreliable (lossy), such as user datagram protocol (UDP). Lossy transmission may be acceptable in a high traffic environment, because the front layer records more than enough call trees for analysis, such as hundreds or thousands per second.

In an embodiment, the back layer includes a telemetry tool such as Graphite. For example, Graphite may integrate the front layer with the back layer of the recording infrastructure that receives call tree fragments from the front layer as transported by UDP, transport control protocol (TCP), or HTTP. Included with Graphite are a durable circular buffer for aging retention of call tree fragments and a graph webserver for visual analysis of service statistics that can be derived from the call tree fragments, such as invocation frequency and execution performance.

Example Software Container

Figure 4:
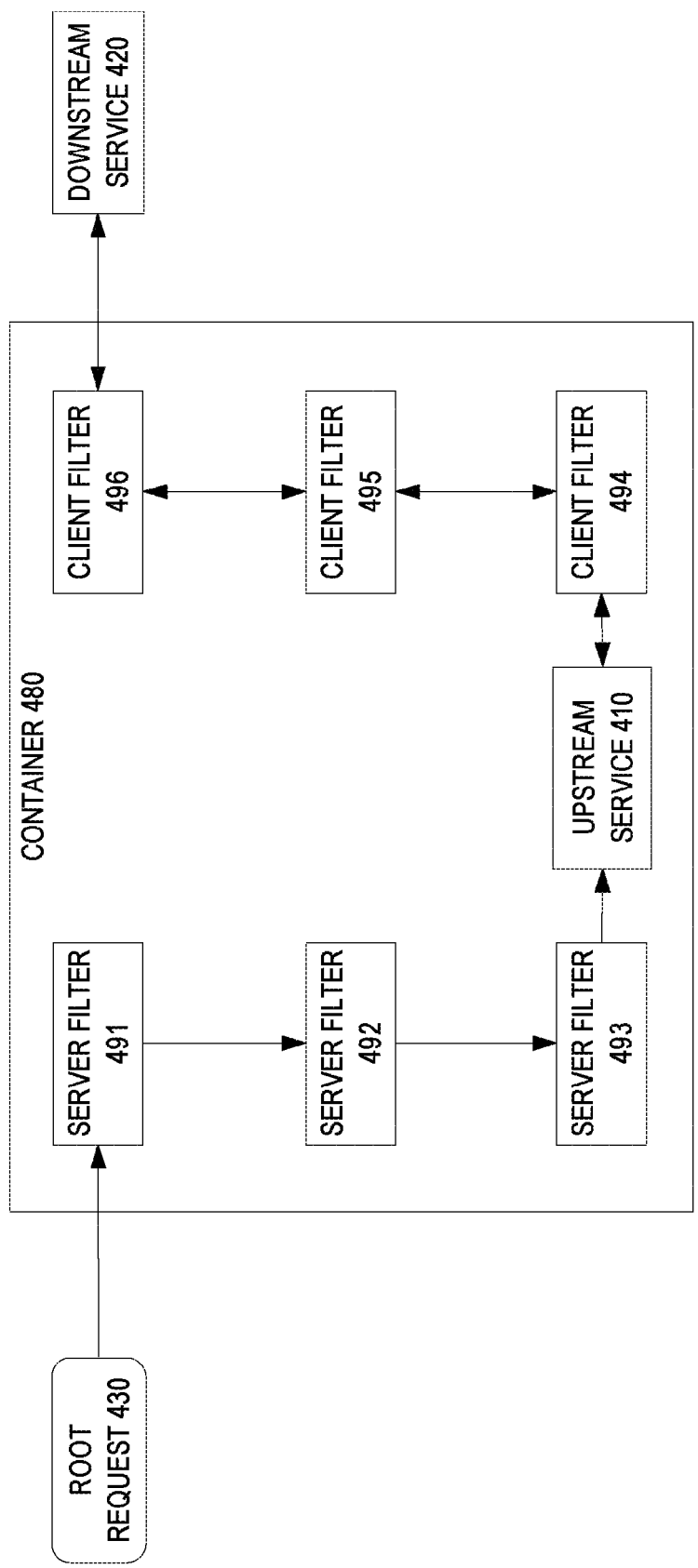
FIG. 4 is a block diagram that depicts an example production cluster that includes a software container for recording call trees, in an embodiment.

FIG. 4 is a block diagram that depicts example production cluster 400 that intercepts interactions between services to implement call tree recording, in an embodiment. Production cluster 400 may be an implementation of computer cluster 100.

Although not shown, production cluster 400 includes computers. Each of software container 480 and downstream service 420 are hosted on any computer of production cluster 400.

Container 480 hosts software components such as service 410 and filters 491-496. Examples of container 480 include an inversion of control (IoC) container, an application server, a webserver, and a bytecode virtual machine.

Filters within container 480 may be sequentially arranged into chains of responsibility. A chain of responsibility is an object-oriented software design pattern that extends the command pattern, which is another design pattern. A command is an encapsulation of a specified activity that may be processed and transferred as a data prior to eventual execution of the command by some agent, such as a service.

A command may be a message, such as a request or response, that can be passed from one filter to another filter along a chain of filters, perhaps configured as a linked list. In this example, server filters 491-493 form a filter chain that faces upstream. Likewise, client filters 494-496 form a filter chain that faces downstream.

Although this example shows chains facing upstream and downstream, both of two chains may be unnecessary depending on the implementation and requirements. This is because both filter chains may record messages.

In this example, root request 430 may be the root request of a call tree. In other examples, root request 430 may be an upstream request that is within a call tree but not the root of the tree. Container 480 receives root request 430 and passes it to the server filter chain.

In sequence and starting with server filter 491, each of server filters 491-493 receives root request 430. Each server filter inspects root request 430 to detect whether root request 430 is a kind of message that the server filter should specially process, such as by altering the message or recording it.

Regardless of whether or not a server filter decides to process root request 430, the server filter eventually passes root request 430 to the next server filter along the filter chain. For example, server filter 491 passes root request 430 to server filter 492.

Although shown with three filters, the server filter chain may have any amount of filters. Any one of the server filters may be part of the recording infrastructure. The other server filters may achieve other purposes, such as security.

For example, server filter 492 may be a recording filter that adds root request 430 to an existing call tree record or, if root request is the root of a call tree, create a new call tree record to add the request to. Server filter 492 may detect or synthesize the identifier of root request 430. If root request 430 is part of an existing call tree, then server filter 492 may correlate, as explained elsewhere herein, root request 430 to a particular position in the call tree.

Not all embodiments require correlation. In an embodiment, each request or response, regardless of its position within a call tree, may each be recorded in a separate record. Such an embodiment may defer correlation until after recording or avoid correlation altogether. For example, some profiling tactics and strategies that are pursued after recording may either not need a call tree or may infer a call tree from individually recorded request and responses, perhaps according to the correlation techniques explained elsewhere herein.

Not all embodiments record traffic through every service of a call tree. In an embodiment, only a particular service or subset of services within a call tree participates in recording. For example, an embodiment records the requests and responses that involve a service that participates in recording. In such an embodiment, production cluster 400 may for any response that is sent or received by that recording node cause that response to be correlated to its associated request. In such an embodiment, a record may contain only a fragment of a call tree. For example, a service that sends two downstream requests in response to receiving one upstream request may result in a recorded fragment of a call tree that contains only those three requests and their correlated responses.

Eventually, root request 430 reaches server filter 493, the last filter in the server filter chain. Server filter 493 passes root request 430 to upstream service 410 that actually fulfils the request. Upstream service 410 may receive root request 430 transparently, which is without any awareness that the request passed through a filter chain.

Upstream service 410 may make calls to downstream services, such as 420, by sending a downstream request. To do this, the downstream request is passed through the chain of client filters 494-496. Passage into the chain begins at client filter 494, which may be initiated directly by upstream service 410 or transparently by container 480.

Any one of client filters 494-496 may be a recording filter that records the downstream request into a call tree fragment. For example, client filter 495 may be part of the recording infrastructure. Client filter 495 may add metadata to the outgoing downstream request. Client filter 495 may add a message header that bears an identifier of root request 430.

Eventually, the downstream request reaches client filter 496, the last filter in the chain. Client filter 496 either directly sends the downstream request to downstream service 420 or container 480 transparently sends the downstream request.

Although not shown as such, downstream service 420 may reside inside container 480 or another container that is similar to container 480. As such, the downstream request sent from upstream service 410 to downstream service 420 may pass through the client filter chain as it leaves container 480 and then pass through a server filter chain as it enters the container of downstream service 420.

If both of the client chain and the server chain, which the downstream request passes through, records the downstream request, then that request would be recorded twice. In an embodiment, a server filter may decide not to record a request that already has recording metadata such as a root request identifier. Likewise in an embodiment, a client filter may decide not to record a response the already has recording metadata.

As explained, some requests and responses pass through a server filter chain, while other request and responses pass through a client filter chain. In an embodiment, a server filter performs recording, and a client filter also performs recording. However, no request or response is recorded by both a server filter and a client filter, because no request or response passes through both filter chains.

In an embodiment, container 480 correlates a response with a request as a pair. In an embodiment, a record contains a single request/response pair. In an embodiment, a record contains a single call tree fragment that consists of all of the request/response pairs that involve service 410 for a particular call tree instance.

In an embodiment, only a server filter performs recording. In another embodiment, only a client filter performs recording.

In an embodiment, containers such as 480 have a server filter chain but not a client filter chain. In another embodiment, the containers have a client filter chain but not a server filter chain.

Downstream service 420 may answer the downstream request by sending a downstream response to upstream service 410. In an embodiment as shown, the client filter chain is bidirectional and handles inbound downstream responses as well as outbound downstream requests. In another embodiment, a filter chain is unidirectional, but container 480 has two filter chains, with one filter chain that sends downstream requests and another filter chain that receives downstream responses. In an embodiment, the downstream response passes through the same filter chain as root request 430 passes through. In another embodiment, the downstream response does not pass through a filter chain within container 480.

Production cluster 400 uses filter chains to propagate a root identifier, correlate messages, and record call tree fragments. However, this is only half of an extended scenario.

The other half involves subsequent consumption of the call tree records for analysis, perhaps by a different computer cluster for internal use only, such as a laboratory cluster or a big data cluster. An example of subsequent analysis may be regression testing that involves instantiating one, some, or all of the services that participated within the call tree and then replaying the messages (requests and responses) of the call tree to those instantiated services.

For example, a test harness may operate as a software container with message replay capability. Message replay may be used to mock most or nearly all of the services involved with the call tree.

For example, a service that is instantiated for a regression test may be a service under test (SUT). The test harness may replay an upstream (or root) request of a recorded call tree by injecting the request into the service under test.

The service under test may react to the replayed request by attempting to send requests to downstream services. However, downstream services may or may not be available (instantiated) in the test laboratory.

As such the test harness may intercept the outbound downstream requests. Using the correspondence techniques described elsewhere herein, the test harness may read the recorded call tree to detect which recorded downstream request is identical or similar to the intercepted downstream request and which recorded downstream response answered the recorded request.

The test harness may mock the unavailable downstream service by replaying the recorded downstream response into the service under test. In this way, the test harness may selectively replay messages to mock the availability of arbitrary portions of a call tree.

For example, the service under test may be the only service of the call tree that is actually instantiated in the test laboratory. As such, a regression test may be an integration test or a unit test.

In an embodiment of the test harness, interception of messages to unavailable services and replay mocking of messages from unavailable services may be accomplished with a container and filter chain having designs similar to those of container 480 of production cluster 400. As such, some filter chaining may implement the recording infrastructure in one deployment, and other filter chaining may implement the replay infrastructure in another deployment.

Making records available for replay outside of production cluster 400 may present privacy risks. In one example, the records may contain confidential data, such as personally identifiable information (PII), which should only be available within the same secure production environment in which it was recorded.

In another example, availability of records to additional environments is acceptable so long as PII is obscured or otherwise removed from the records. In an embodiment, container 480 obscures or removes sensitive fields as part of the recording process.

Example Call Tree

Figure 5:
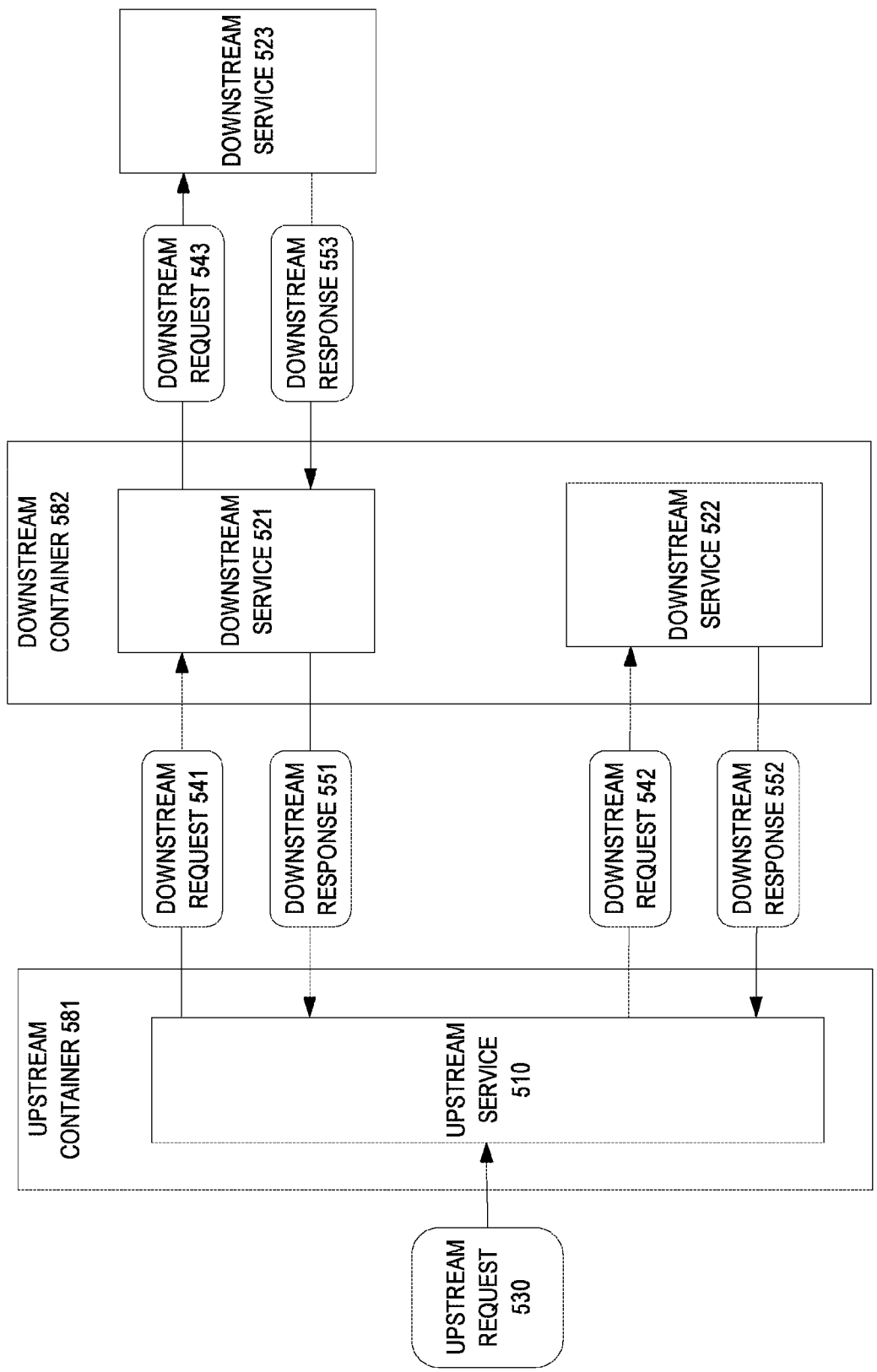
FIG. 5 is a block diagram that depicts an example computer that hosts service containers that record call trees, in an embodiment.

FIG. 5 is a block diagram that depicts example computer 570 that executes part (a fragment) of a call tree, in an embodiment. This call tree fragment exhibits depth and breadth and spans container boundaries.

Example computer 570 hosts software containers 581-582. Upstream container 581 hosts upstream service 510 that receives upstream request 530.

In fulfillment of upstream request 530, the call tree fans out when upstream service 510 invokes multiple downstream services 521-522 that reside in downstream container 582. For example, upstream service 510 sends downstream request 541 to downstream service 521. Fan out may cause a call tree of arbitrary breadth.

Downstream service 521 may in turn invoke downstream services, such as 523. Such cascading of downstream calls may result in a call tree of arbitrary depth.

In one embodiment, the entire call tree is recorded. In another embodiment, only traffic that directly involves a particular service of interest is recorded. For example, if upstream service 510 is a focus of recording, then only messages 530, 541-542, and 551-552 are recorded.

It does not matter that the call tree may span an arbitrary number of services, containers, operating system processes, computers, and networks. In any case, the recording infrastructure intercepts the messages (request and responses) of the call tree, decorates the messages with the necessary metadata such as timestamps and identifiers of contextual objects such as the call tree or its root request, correlates the messages with each other, detects the proper positions of the messages within the call tree, and records the call tree, perhaps as fragments.

Record Publication

The beneficial value of call tree records created by the recording infrastructure depends on the ability of the recording infrastructure to deliver those records to important consumers. For example, consumers of call tree records may include a regression test, an analysis suite, or a record archive such as a file, a relational or NoSQL database, or a warehouse for mining and reporting.

Figure 6:
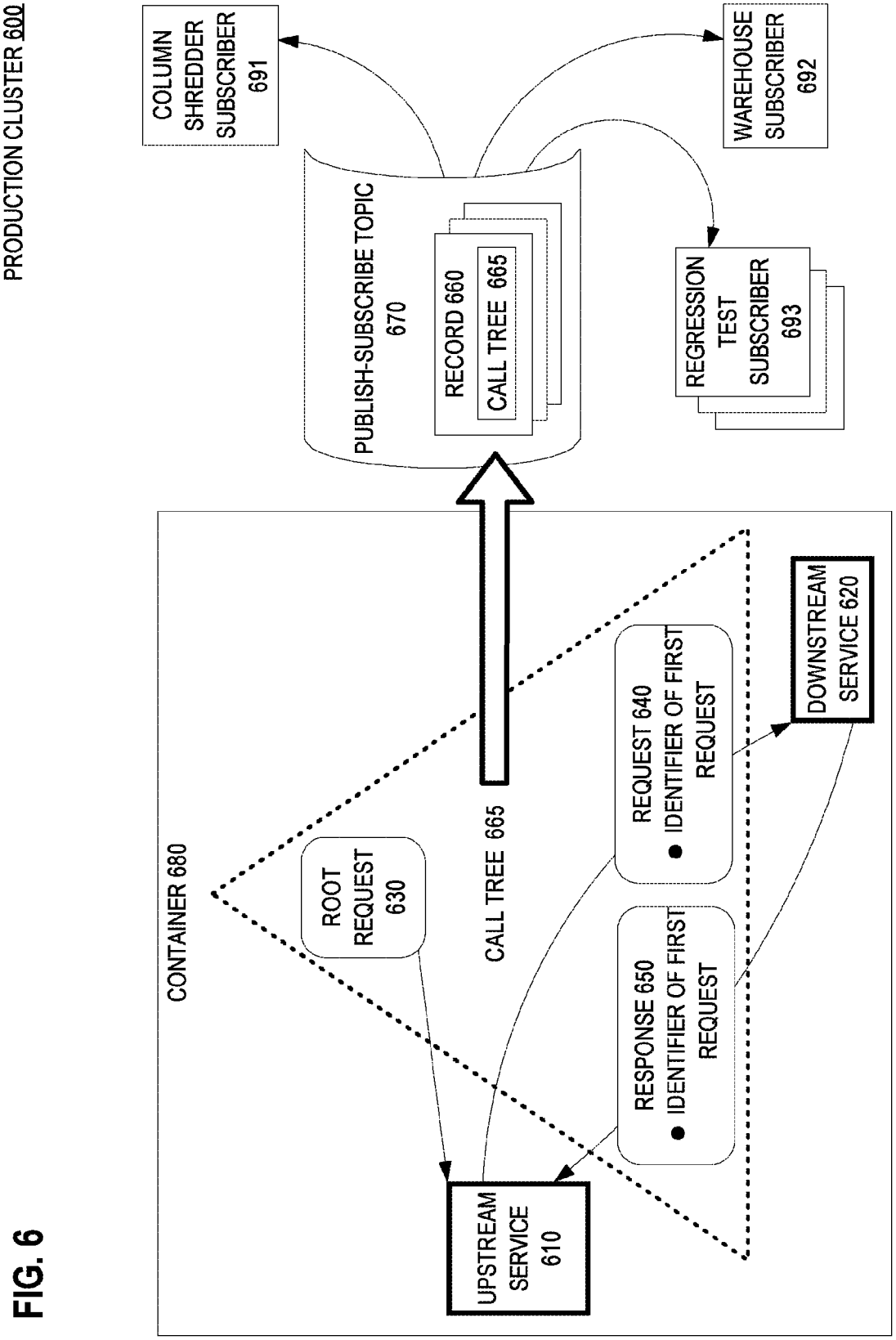
FIG. 6 is a block diagram that depicts an example production cluster that publishes recorded call trees, in an embodiment.

FIG. 6 is a block diagram that depicts example production cluster 600 that publishes call tree records to an audience of various consumers, in an embodiment. Production cluster 600 may be an implementation of computer cluster 100.

Production cluster 600 includes software container 680, publisher-subscriber topic 670, and subscribers 691-693. Container 680 executes and captures service call trees as records and publishes those records. Publisher-subscriber topic 670 broadcasts the call tree records to an audience, which includes subscribers 691-693 that consume the call tree records.

Container 680 hosts services 610 and 620. In an embodiment, either or both of services 610 and 620 may be declaratively configured within container 680 according to an instrumentation or inversion of control (IoC) framework, such as Spring.

A declarative configuration may specify various deployment details. For example, the configuration may specify how each service is exposed to clients, such as which service is associated with which endpoint name or URL.

The configuration may specify dependencies (so-called "wiring") between services or other resources. In one embodiment, a declarative configuration is encoded as a descriptor, such as an XML, file.

In another embodiment, the configuration is encoded as type attributes, such as JAVA annotations. For example, container 680 may perform aspect weaving or other logic enhancement when instantiating services.

In production, upstream service 610 receives a live request that may be an upstream request from another service or a root request, such as 630, from an external client. Processing of root request 630 causes call tree 665 to execute within container 680. Container 680 records call tree 665 (including messages 630, 640, and 650) into record 660.

Container 680 publishes a batch of records or a more or less continuous stream of individual records, such as 660, to publish-subscribe topic 670. In a high performance embodiment, topic 670 may be a high throughput Kafka topic that is highly available to many subscribers (data consumers).

A Kafka topic has a durable circular bounded buffer for rolling retention of records with straightforward administration and capacity planning. In an embodiment, publish-subscribe topic 670 has a durable buffer that retains each record only for a fixed duration, such as 24 hours.

Any data consumer, such as subscribers 691-693, may subscribe to receive records from topic 670. If topic 670 is a Kafka topic, then each subscriber polls for new records and receives copies of records.

Column shredder subscriber 691 receives a stream of records that shredder 691 splits into separate parallel streams of columns that each contain values from a respective field of the records. Because each record is associated with a call tree, fields such as a tree identifier and a root request identifier may be emitted by shredder 691 as separate streams. The column streams may be stored in a column-oriented database instead of a relational or other tabular database.

Warehouse subscriber 692 receives a stream of records that warehouse 692 archives for analytics later. For example, Kafka has a facility that spools records from a topic into a Hadoop distributed file system (HDFS). In an embodiment, topic 670 is a JAVA message service (JMS) topic.

Subscribers 691-692 may be subscribed indefinitely or only for particular periods, such as around the time of a new release. Regression test subscribers 693 subscribe only for brief or extended sessions to receive recorded call trees for replay during regression testing.

For example, upstream service 610 may execute subroutines of a third party library. A software developer may revise the source code of upstream service 610 to use a more recent release of the third party library. However, the developer may be unsure whether the more recent release of the third party library is backward compatible. For example, the more recent release of the third party library might cause upstream service 610 to malfunction for a tiny subset of possible invocations of upstream service 610. Before committing the revised source code of upstream service 610 to version control, the developer may unit test the revision by subjecting the revision to a regression test. The test harness may temporarily subscribe to topic 670, perform a regression test by receiving and replaying many call trees, and then unsubscribe from topic 670.

In an embodiment, each root service that may be directly invoked by a root request may have its own topic to record and replay call trees that includes the root service. For example, if services 610 and 620 are part of a web application, then upstream service 610 has an endpoint that is addressable by uniform resource locator (URL) to which external clients such as web browsers may send root HTTP requests, such as 630.

That endpoint from the URL may be used to name or otherwise select a topic to which the recording infrastructure should publish. That enables different regression test subscribers 693 to subscribe to different topics to receive only recorded traffic of particular services. This enables focused regression tests that may be used as unit tests, such as by a software developer.

Multiple Call Trees

Figure 7:
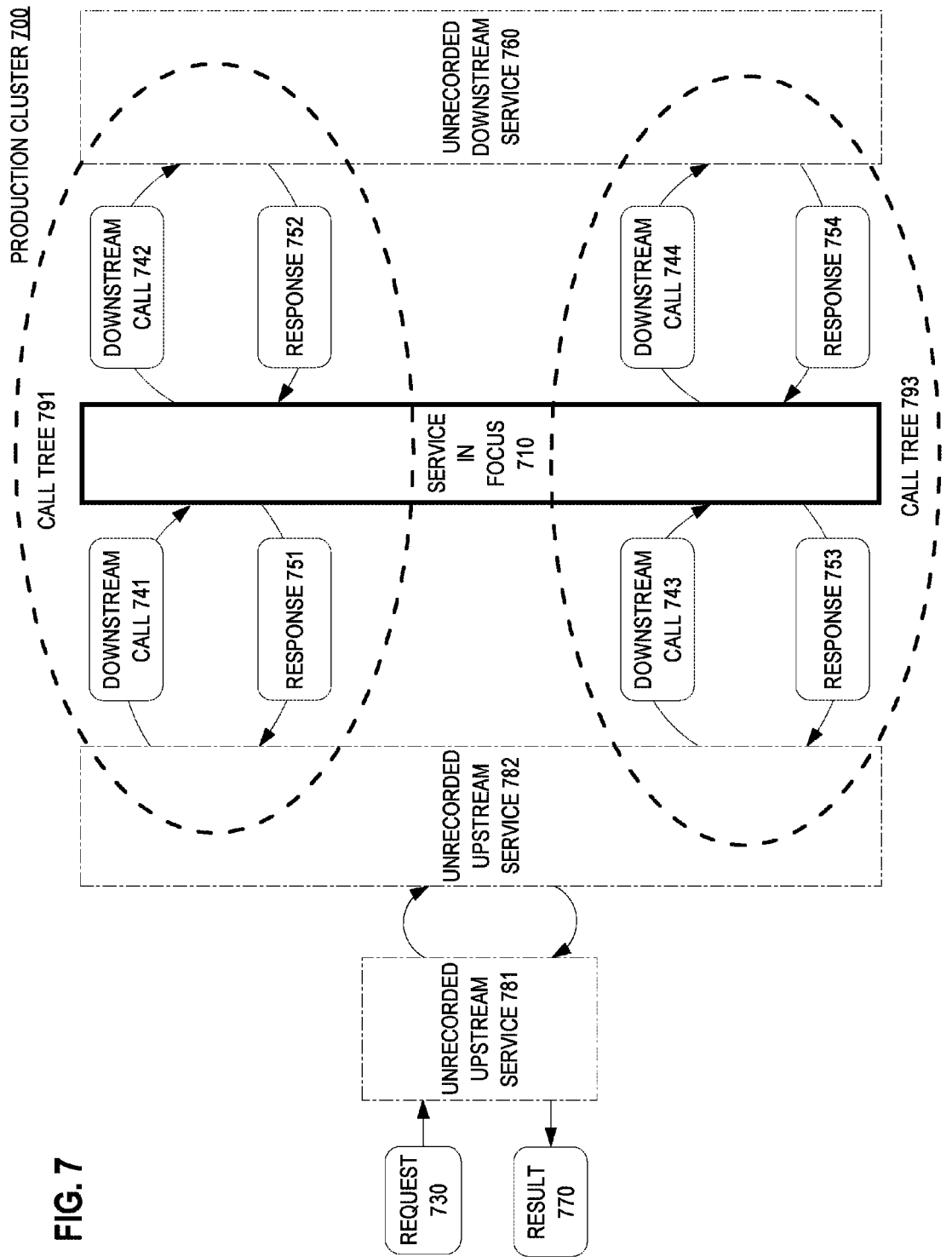
FIG. 7 is a block diagram that depicts an example production cluster that records invocation traffic for a selected service, in an embodiment.

FIG. 7 is a block diagram that depicts example production cluster 700 that records invocation traffic only for a service in focus, in an embodiment. Production cluster 800 may record for a service in focus that is repeatedly invoked during a single processing of a single request.

Production cluster 700 may be an implementation of computer cluster 100. Production cluster 700 includes services 710, 760, and 781-782.

Depending on the implementation, recording may introduce drag (latency) or instability (complexity and risk of malfunction) that may be unacceptable in production. In that case, recording may be used sparingly.

For example, a software developer or tester may only be interested in a particular service, which in this example is service in focus 710. To minimize recording, recording may be limited only to interactions that directly involve service in focus 710. In this example, service in focus 710 mediates between upstream service 782 and downstream service 760.

In this example, a stack of two upstream services 781-782 are upstream of service in focus 710. In other examples, the stack of upstream services may have as few as one upstream service or arbitrarily many upstream services.

In operation, request 730 is sent to upstream service 781. During processing of request 730, upstream service 781 calls upstream service 782, which makes two downstream calls, 741 and 743, to service in focus 710.

As such, service in focus 710 is invoked twice for a same invocation of upstream service 782. Repeated invocations may be complicated if one response is correlated to one call based on the identity of the called service, 710.

For example in FIG. 7, responses 751 and 753 are both emitted by the same service in focus 710 and so cannot be readily distinguished from each other based solely on the identity of service in focus 710, which can confuse the recording of responses 751 and 753. The recording infrastructure accommodates repeated calls to a same service by enhancing the identifier of each downstream call.

Instead of basing a call identifier solely on a called service, the call identifier is a compound identifier that is composed of a call tree identifier in addition to the called service identifier. For example, downstream calls 741 and 743 may each be the root of a separate call tree. As such, the processing of a single request 730 causes two call trees, 791 and 793, shown as dashed ellipses.

Creation of multiple call trees from a single request may require that the production recording infrastructure be informed as to which service makes the root downstream calls of the two call trees. For example, the recording infrastructure may receive a parameter that indicates that service 710 is the focus of the recording and is intended to become a service under test during subsequent regression testing, perhaps on a different cluster. As such, the recording infrastructure may treat each call (741 and 743) that invokes service in focus 710 as a root of a separate call tree. Each call tree may be assigned a distinct call tree identifier.

Each downstream call may include (perhaps as a header field) the identifier of the call tree in which the downstream call was made and/or the identifier of request 730. For example, downstream calls 741-742 and responses 751-752 may all bear the identifier of call tree 791.

Given that a call identifier may be a composite of a service identifier and a call tree identifier, during recording, response 752 can be readily correlated to downstream call 742. Likewise response 754 can be correlated to downstream call 744.

In this way, repeated invocations to a same downstream service can be properly recorded as separate calls along with their separate responses. A data structure to accommodate such separation is shown in FIG. 8.

Hash Table of Call Trees

Figure 8:
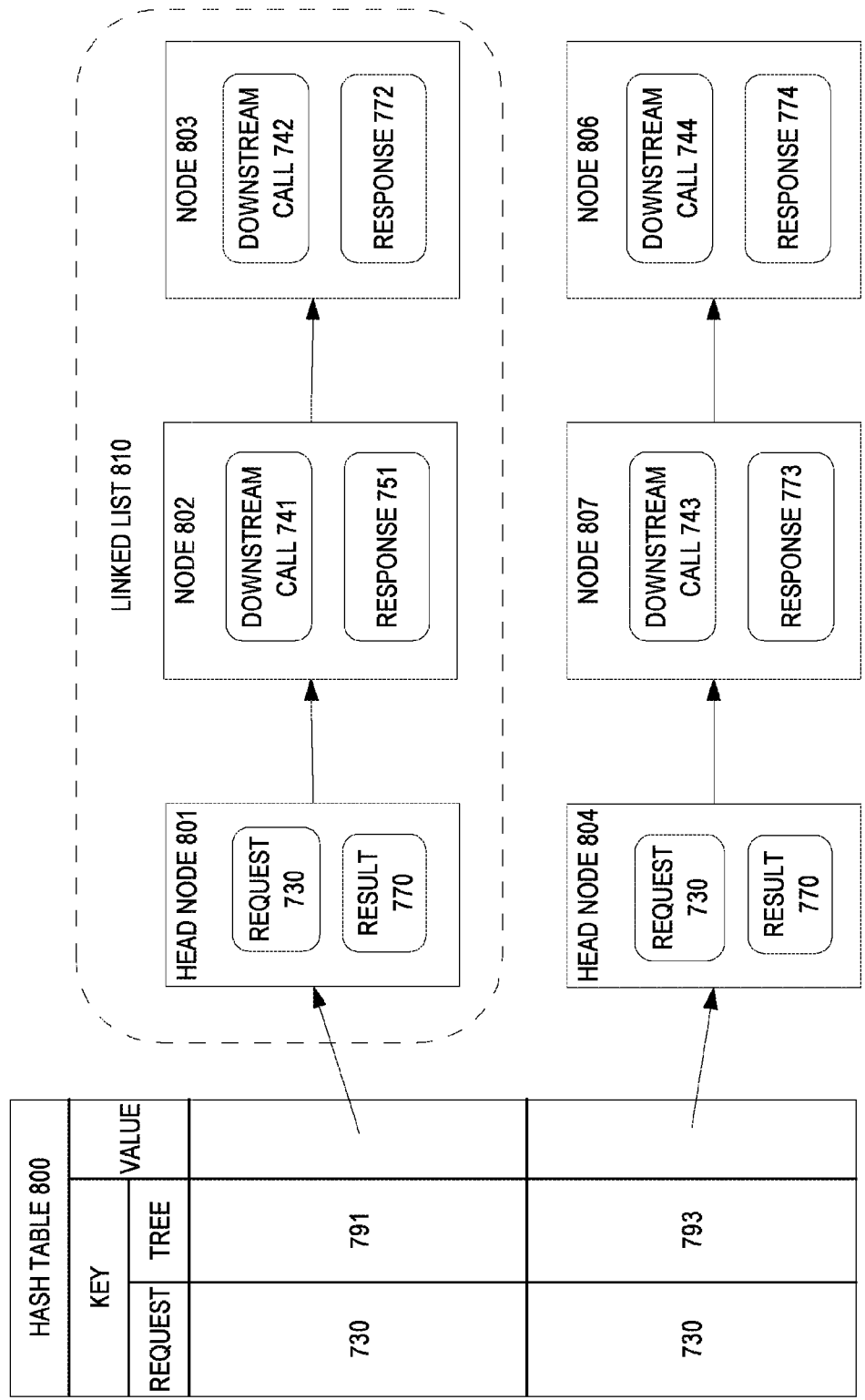
FIG. 8 is a block diagram that depicts an example computer that includes an example hash table that stores call trees, in an embodiment.

FIG. 8 is a block diagram that depicts example computer 870, which includes hash table 800 that stores multiple recorded call trees, in an embodiment. Computer 870 resides within, and is discussed in relation to, production cluster 700.

Hash table 800 contains pairings of a key with a value. Each key may be a composite of an identifier of a request, such as 730, and an identifier of a call tree, such as 791 or 793.

Each value of hash table 800 may be a reference to a linked list, such as 810, that encapsulates the call tree that is identified by the tree identifier of the key. The mechanics for construction (recording) of each list is explained later herein.

During recording, the identifiers of the original request (e.g. 730) and the current call tree are included as header fields of the current call or response. These header fields are propagated downstream and copied into any call or response that occurs downstream. For example, downstream call 742 may bear the identifiers of request 730 and call tree 791 as header fields. The production recording infrastructure can read those header fields to construct a compound key for use with hash table 800. In this way, when recorded response 752 needs correlation with downstream call 742, the compound key may be used to look up downstream call 742 from within hash table 800. In some implementations, a compound key may be unnecessary. For example, if a tree identifier is globally unique across all requests, then the tree identifier by itself is sufficient as a key. However, it is generally important to be able to associate multiple call trees with one request. For that reason, a compound key may be composed of a tree identifier and a request identifier.

Hash table 800 may have additional key-value pairs. For example, hash table 800 may also store a call tree of another request (not 730 and not in a same transaction as 730) for the same upstream service 780. Likewise, hash table 800 may also store a call tree for an unrelated request that invokes a different upstream service than 780.

During processing of request 730, the extent and number of recordable call trees involved may be unknown until request 730 has been fully processed, including emission of result 770. As such, linked list 810 is well suited for dynamically gathering the nodes (calls and responses) of the call tree, because a linked list can be constructed in linear time and without the slow and non-deterministic resizings of a compact (contiguous) data structure, such as an array-based structure, such as an ArrayList in JAVA.

Initially when downstream call 741 occurs, production cluster 700 constructs linked list 810 with only two nodes, which are head node 801 that stores request 730 and node 802 that stores downstream call 741. As service in focus 710 processes downstream call 741, downstream calls are made directly (such as 742) or indirectly such as by downstream service 760 to another downstream service not shown.

When each downstream call occurs, a new node is appended to linked list 810 to record that downstream call. In an embodiment, only downstream calls directly emitted by service in focus 710 are recorded.

Each time a response occurs, such as 751-754, production cluster 700 correlates the response with the downstream call that caused the response. This correlation may be performed by matching some header fields of the request and the response. For example, each downstream call may be assigned a call identifier that is based on the downstream service that is invoked by the call. If a downstream service has a service interface with multiple entry points, then the call identifier may also be based on which entry point is invoked by the call.

A downstream call may bear its call identifier as a header field. The call identifier may be copied into a header field of the response. Subsequent correlation between call and response may be based on matching the call identifier.

By performing this matching correlation, production cluster 700 may look up, within linked list 810, a node that contains the downstream call that corresponds to a given response. For example, response 751 belongs in node 802 because node 802 contains downstream call 741. This look up may be accelerated by using a hash table instead of linked list 810.

When a node is appended to linked list 810, the node contains only a downstream call. When the corresponding response occurs, the response is stored in the same node as the downstream call.

Eventually, upstream service 781 emits result 770, which gets stored in head node 801. Finally, linked list 810 is complete (fully populated).

Hash table 800 is an object graph (closed set of interconnected objects) that may then be streamed as a content unit, such as a message. For example, hash table 800 may be published to a Kafka topic.

An advantage of a brokered feed, such as Kafka, is that stream content can be durably spooled and eventually purged based on age, perhaps as a circular buffer. This may ensure that ample and recent traffic is always available for replay.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
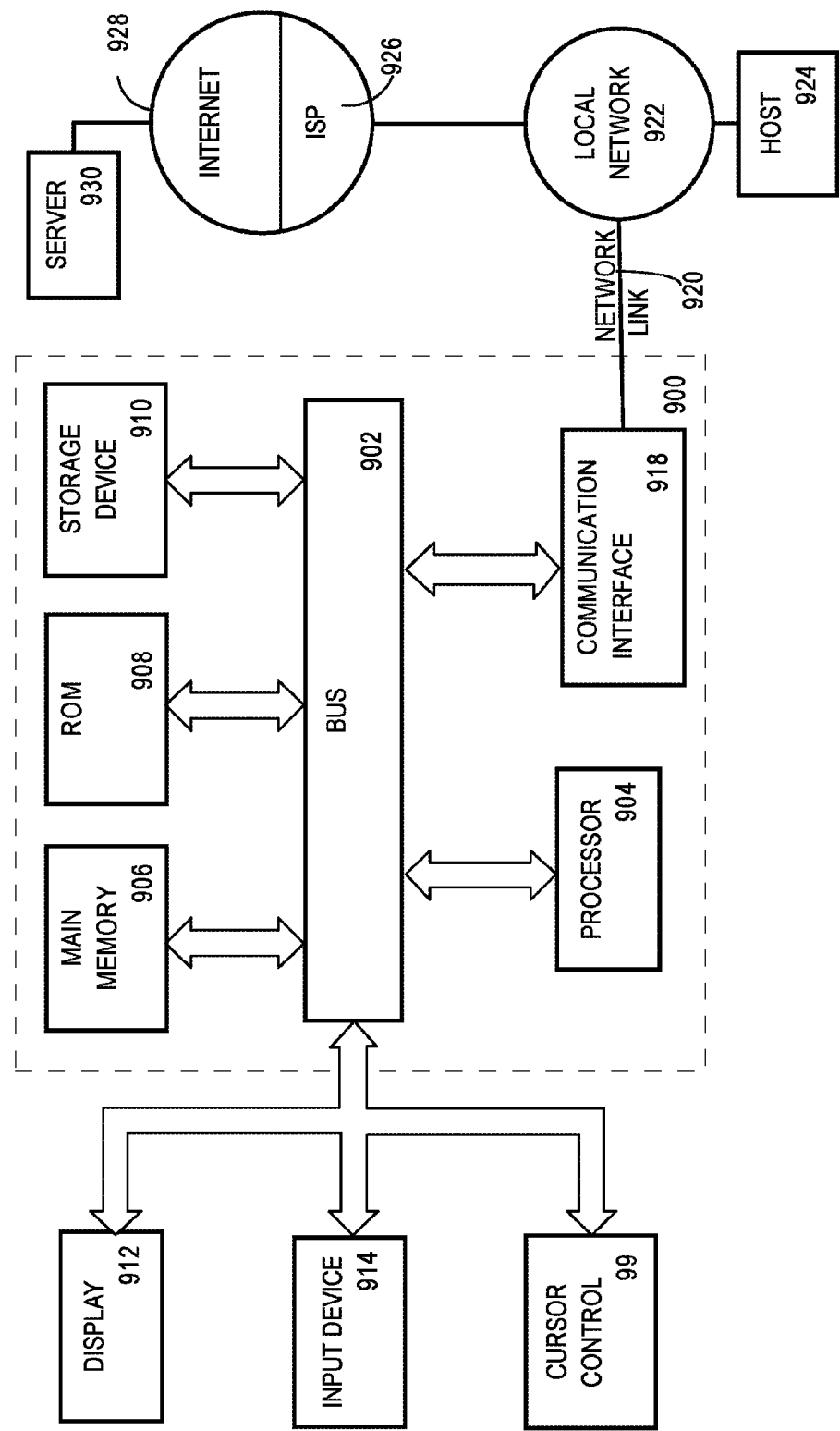
FIG. 9 is a block diagram that illustrates an example computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 99, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910.

Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for recording request traffic at a computing device, the method comprising:
   receiving a first request that is directed to a first service;
   in response to receiving said first request, performing:
      storing an identifier of said first request and an identifier of a first call tree into a second request;
      after storing the identifier into said second request, causing said second request to be sent to a second service;
      storing, into a third request, said identifier of said first request and an identifier of a second call tree; and
      sending said third request for delivery to said second service;
   after causing said second request to be sent to said second service, receiving, from said second service, a response that contains said identifier of said first request and the identifier of the first call tree;
   storing, in a single record, said first request, said second request, said third request, and said response;
   wherein the method is performed by one or more computers.

2. The method of claim 1, wherein:
   the computing device is a first computing device;
   the first service executes on the first computing device;
   the second service executes on a second computing device that is different than the first computing device.

3. The method of claim 1 wherein said first service and said second service are hosted by a same container.

4. The method of claim 1 wherein:
   the method is performed by a first container that executes on the computing device;
   the second request is sent to a second container that is associated with the second service;
   the first container and the second container reside on the computing device.

5. The method of claim 1 wherein a hypertext transfer protocol (HTTP) header comprises said identifier of said first request, wherein said HTTP header is contained in at least one of: said second request or said response.

6. The method of claim 1 wherein said second service does not access said identifier of said first request.

7. The method of claim 1 wherein said response comprises at least one of: extensible markup language (XML) or JavaScript object notation (JSON).

8. The method of claim 1 further comprising:
   storing said identifier of said first request into a fourth request;
   sending said fourth request to a third service that is not any of: said first service or said second service.

9. The method of claim 1 further comprising publishing said single record to a publish-subscribe topic.

10. The method of claim 1 further comprising at least one of: storing said single record into a fixed-size durable buffer or storing said single record into a durable buffer for a fixed duration.

11. The method of claim 1 wherein receiving said first request comprises invoking a chain of responsibility within a container that hosts said first service.

12. The method of claim 1 wherein sending said second request comprises invoking a chain of responsibility within a container that hosts said first service.

13. The method of claim 1 wherein a dependency descriptor of said first service comprises an identifier of at least one of: said second service or a container that hosts said second service.

14. The method of claim 1 wherein a JAVA annotation of said second service is accessed by a container that hosts said second service.

15. The method of claim 1 wherein sending said second request comprising asynchronously sending.

16. The method of claim 1 further comprising:
a container that hosts said first service receiving a second response;
responsive to detecting that said second response does not contain an identifier that said container inserted into a prior request, not storing said second response into a record.

17. The method of claim 1 wherein storing said response comprises storing an imperfect copy of said response.

18. The method of claim 1 further comprising storing into an in-memory hash table at least one of: said identifier of said first request or an identifier of a call tree.

19. One or more non-transitory computer-readable media storing instructions that, when executed by one or more processors, causes:
receiving a first request that is directed to a first service;
responsive to receiving a first request by a first container that hosts a first service, performing:
storing an identifier of said first request and an identifier of a first call tree into a second request;
after storing the identifier of said first request into said second request, sending said second request for delivery to a second service;
into a third request, storing said identifier of said first request and an identifier of a second call tree; and
sending said third request for delivery to said second service;
after sending said second request for delivery to said second service,
receiving, from said second service, a response that contains said identifier of said first request and said identifier of said first call tree;
into a single record, storing said first request, said second request, said third request, and said response.

* * * * *